United States Patent [19]

Burkhead

[11] Patent Number: 5,451,076
[45] Date of Patent: Sep. 19, 1995

[54] PNEUMATIC TRAILER LANDING GEAR

[75] Inventor: Paul Burkhead, Willisburg, Ky.

[73] Assignee: New Way Corporation, Willisburg, Ky.

[21] Appl. No.: 169,217

[22] Filed: Dec. 20, 1993

[51] Int. Cl.$^6$ ............................................. B60S 9/02
[52] U.S. Cl. .................................. 280/776.1; 280/475
[58] Field of Search ................. 280/766.1, 763.1, 475; 254/418; 474/548, 902, 903

[56] References Cited

U.S. PATENT DOCUMENTS

| | | | |
|---|---|---|---|
| 2,341,191 | 2/1944 | Orendorff | 474/903 X |
| 2,673,471 | 3/1954 | Kline et al. | 474/903 X |
| 4,116,315 | 9/1978 | Vandenberg | 280/766.1 |
| 4,281,852 | 8/1981 | Konkle | 280/766.1 |
| 4,345,779 | 8/1982 | Busby | 280/766.1 |
| 4,400,986 | 8/1983 | Swanson et al. | 74/128 |
| 4,402,526 | 9/1983 | Huetsch | 280/766.1 |
| 4,466,637 | 8/1984 | Nelson | 280/766.1 |
| 5,054,805 | 10/1991 | Hungerink et al. | 280/475 |
| 5,181,432 | 1/1993 | Allen | 474/903 X |
| 5,299,829 | 4/1994 | Rivers, Jr. et al. | 280/766.1 |

FOREIGN PATENT DOCUMENTS 2223465  4/1990  United Kingdom ............... 280/475

*Primary Examiner*—Robert J. Oberleitner
*Assistant Examiner*—Peter Poon
*Attorney, Agent, or Firm*—Kenneth F. Pearce

[57] ABSTRACT

A pneumatic actuator for a trailer landing gear reduction assembly for directing the raising or lowering of the feet of a trailer. The pneumatic actuator replaces the hand crank which has traditionally been used for turning a gear reduction assembly of the trailer. The present invention can be incorporated onto the already existing trailer landing gear or the present invention can be milled directly onto the newly manufactured trailer.

16 Claims, 2 Drawing Sheets

PNEUMATIC TRAILER LANDING GEAR

BACKGROUND OF THE INVENTION

1. Field of the Invention

The present invention is directed toward a pneumatic actuator for a gear reduction assembly for the landing gear of the trailer. The pneumatic actuator replaces the hand crank which has traditionally been used to raise or lower the feet of the truck trailer. Air pressure generated by the tractor and passed through the length of a brake line of the trailer drives the actuator. The present invention can be incorporated onto the already existing gear reduction assembly of the trailer landing gear or the present invention can be milled directly onto the newly manufactured trailer's gear reduction assembly.

2. Description of the Previous Art a) U.S. Pat. No. 4,116,315 (Vandenberg) discloses a pneumatic landing gear actuator secured to the bottom of the trailer having a cross shaft running therethrough coupled to a first and a second rotable member which raises or lowers the landing gear feet dependent upon the direction the cross shaft is powered. Vandenberg requires two oppositely placed one way clutches (Sprague clutch) having slidable inner and outer driven members for engaging and rotating the cross shaft wherein the inner driven member is provided with spline gear for co-acting with meshing spline gear attached to cross shaft. Additionally, Vandenberg requires a shifting gear for regulating the direction the Sprague clutch driven members rotate the cross shaft turning the rotable members which raise or lower the landing gear feet. Further, Vandenberg requires a piston rod coupled to the pneumatic actuator housing at a first end and a radial arm at a second end wherein the radial arm turns the tube which simultaneously and synchronously rotates the Sprague clutch and the cross shaft passing between the clutch members in a ratchet-like manner.

b) U.S. Pat. No. 4,281,852 (Konkle) discloses a piston driven pneumatic actuator having first and second sets of lever arms including reciprocating pawls for engaging the toothed wheel of the actuator rod for raising or lowering trailer feet. Konkle requires each pawl to be swingably mounted to the lever arms and that each pawl has a body, a shoulder central to the body, depending fingers directed toward the periphery of the toothed wheel and springs for maintaining each pawl in a forward or reverse over-centered relationship with the tooth wheel for providing continuous forward or reverse direction in response to each movement of the actuator rod.

c) U.S. Pat. No. 4,400,986 (Swanson, et. al.) discloses a pneumatic landing gear actuator having first and second gears in a rotatable meshing arrangement for coupling with a rotable member for raising or lowering the feet of a trailer depending upon the direction of rotation. Further, Swanson requires that the first and second gears be engaged by first and second one-way ratchet wheels interacting with first and second pawls associated with first and second ratchet wheels, respectively, with each pawl being mounted on the pneumatic drive member that reciprocates back and forth. The spring assisted back and forth motion of Swanson produces the force for turning the rotable member which raises or lowers the feet of the trailer.

d) U.S. Pat. No. 4,402,526 (Huetsch), having common ownership with U.S. Pat. No. 4,400,986, discloses a landing gear actuator virtually identical to that of the Swanson reference which must be mounted outboard of a foot of the trailer. Additionally, the Huetsch disclosure has required the elements of a fixed angular relationship between the cross shaft and the crankshaft with the cross shaft being defined as the output and the crankshaft being defined as the input. Further, Huetsch requires a reciprocating piston for turning the rotatable member that is coupled to crankshaft which through the gearing mechanism rotates the crankshaft which raises and lowers the trailer feet.

e) U.S. Pat. No. 4,466,637 (Nelson) discloses an electric power drive combination for a trailer landing gear wherein the power drive combination is mounted axially to and coupled with the input shaft of the gear reduction assembly.

SUMMARY OF THE INVENTION

The present invention can replace the commonly used hand crank which has traditionally been used to raise or to lower the trailer's feet.

It is an object of the present invention to provide a pneumatic actuator for a trailer landing gear assembly which directs the raising or lowering of the feet of the trailer.

It is another object of the present invention to provide a pneumatic actuator which is adaptable to the already existing trailer landing gear reduction assemblies.

It is still another object of the present invention to provide a pneumatic actuator which can be incorporated onto the trailer during the manufacture of the trailer.

Further still, it is another object of the present invention to provide a pneumatic actuator which is driven by the already existing air pressure provided to the trailer, such as, the pressure generated by the tractor to the trailer's brake line.

Unlike the previously indicated references, it is a further object of the present invention to provide a pneumatic actuator which is compatible with an already existing trailer gear reduction assembly that works in simple relation to the gear reduction assembly; thereby eliminating the requirement of the more complicated ratchet-like inventions disclosed above. More specifically, the present invention does not require the use of a Sprague clutch, reciprocating pawls, ratchet wheels or a reciprocating piston for its use. Rather a simple conveyor, such as a chain or a belt, or direct intermeshing of the toothed wheels, sprockets or gears transfers motion from the pneumatic motor to the landing gear reduction assembly. In accordance with the present invention, motion can be transferred directly from the turning shaft of the pneumatic motor to a gear which thereafter rotates the gear reduction assembly that raises or lowers the feet of the landing gear.

Prior to the present invention, it has been determined that a combination of elements capable of actuating the gear reduction assembly which utilized commercially available pneumatic motors was virtually impossible. By way of example, prior to the present invention, a pneumatic motor which was large enough to generate adequate power for turning the gear reduction assembly was too bulky to be used conveniently or commercially with the trailer, the gear reduction assembly or the landing gear. But as will be disclosed more fully hereinafter, the construction of the present invention has eliminated those former difficulties. And upon reading this disclosure other advantages of the present invention over prior disclosures shall become more apparent to those skilled in the art.

For the sake of simplicity, the present invention can be described as a pneumatic actuator which comprises: a mount for the pneumatic motor, an air line for supplying pressure for driving the pneumatic motor rotating a shaft coupled to a first sprocket, a conveyor for transferring motion from the first sprocket to a second sprocket transverse to a shiftable shaft having a hole therethrough, a housing for preventing the second sprocket from shifting when the shiftable shaft is shifted to engage the gear reduction assembly and a pin crosssecting the hole for transferring rotable motion to the shiftable shaft which ultimately directs the feet of the trailer.

For the purposes of this disclosure, "rotable motion" shall be defined as clockwise or counter-clockwise movement about the moving element's central axis relative to its outermost external circumference.

A description of the preferred embodiment of the present invention follows, and it is to be understood that the disclosure and the best mode description of the preferred embodiment is in no manner or form capable of limiting the scope of the present invention.

DESCRIPTION OF THE PREFERRED EMBODIMENT

Although the disclosure hereof is detailed to enable those skilled in the art to practice the invention, the embodiment disclosed herein merely exemplifies the present invention which can be practiced in other specific structures. The scope of the present invention is defined in the claims appended hereto.

Figure 1:
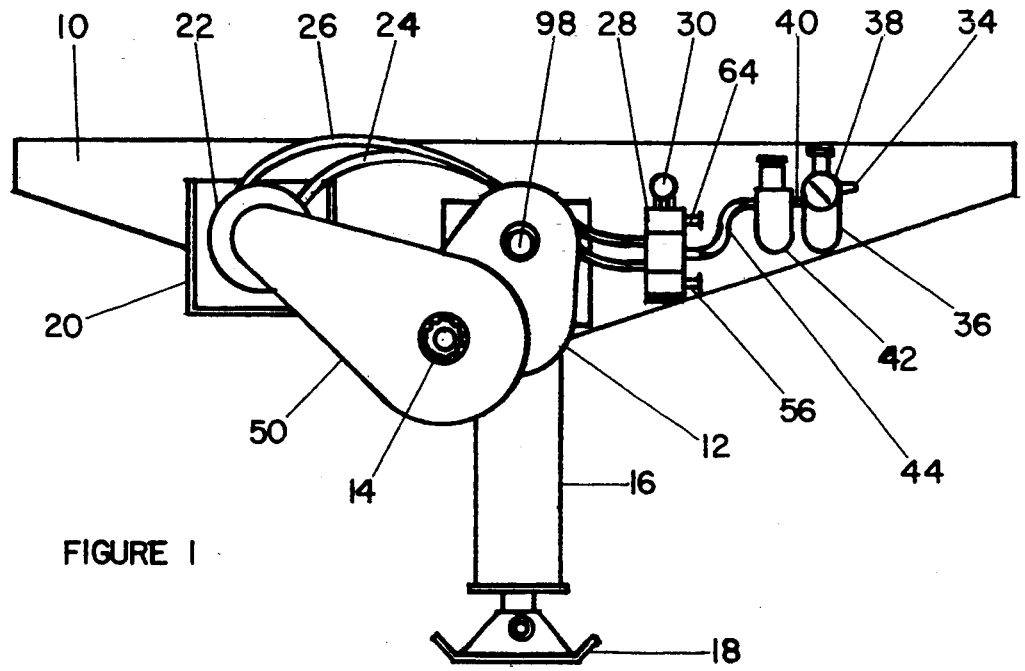
FIG. 1 is a frontal view of the side of the trailer holding the present invention as it relates to the trailer's landing gear.
Figure 2:
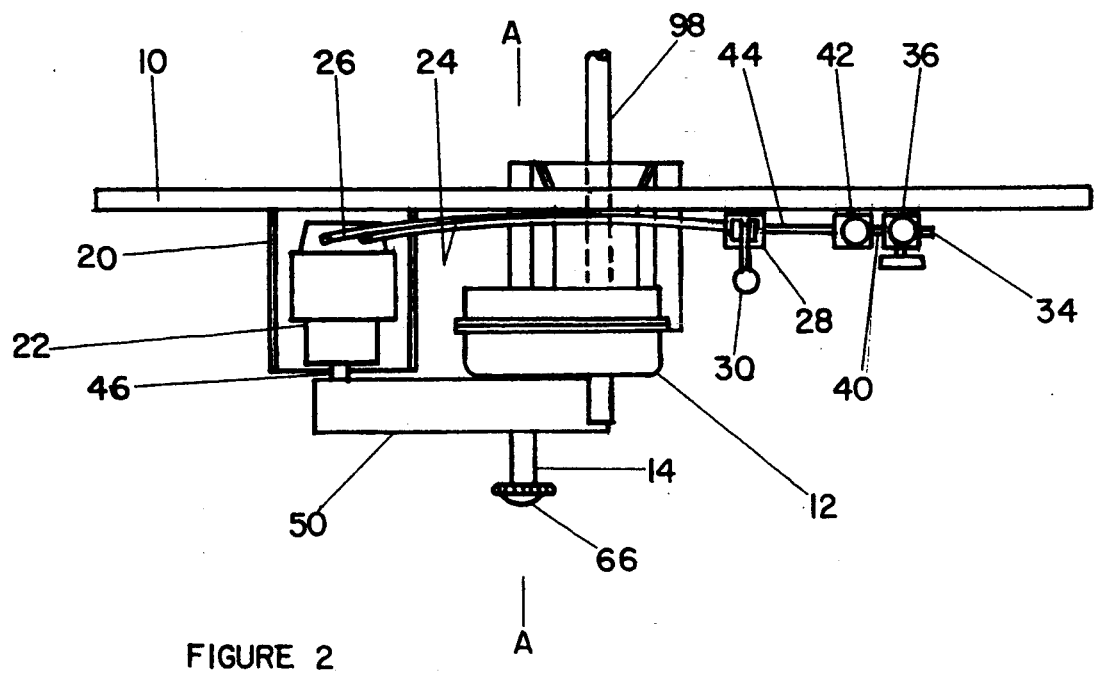
FIG. 2 is a top view of the present invention as it relates to the trailer's landing gear.

Attention is directed to FIGS. 1 and 2. FIG. 1 is a frontal view of the side of the trailer and includes the present invention while FIG. 2 is a top view of the present invention relative to the support beam (10). Support beam (10) for trailer bed is provided with gear reduction assembly (12) (internal workings not shown) having a shiftable shaft (14) projecting therefrom. As shown in FIG. 2, shiftable shaft (14) can be shifted back and forth along the A—A axis for engaging different gearing ratios found within gear reduction assembly (12), such as 1:1 or 1:7½, which are commonly found in the art.

Best shown in FIG. 1, trailer landing gear includes gear reduction assembly (12) and telescoping leg (16) that raises or lowers foot (18). Opposite telescoping leg (16) and foot (18) are a matching leg (16A) (not shown) and foot (18A) (not shown); the combination providing support for the trailer, when the tractor is separated from the trailer. By way of reference herein, telescoping leg (16) or foot (18) can mean either a single leg or foot or the plural combination of legs or feet depending upon the common sense context of the sentence in which the words are disclosed. For example, turnable shaft (98) extends from gear reduction assembly (12) and between telescoping legs (16) for transferring torque from gear reduction assembly (12) via telescoping legs (16) to feet (18), thereby raising or lowering the trailer.

In the industry, a hand crank (not shown) is normally coupled to shiftable shaft (14) for powering gear reduction assembly (12) which directs the trailer's landing gear. In accordance with the practice of the present invention, the requirement of hand cranking the gear reduction assembly (12) of the trailer landing gear is antiquated. But should the need arise, in the present embodiment, handle (66), housing (50) and pin (78) shown in FIGS. 3-5 can be removed so that the hand crank may be attached to shiftable shaft (14) for engaging gear reduction assembly (12). Additionally, pin (78) can be provided with a hexagonal head for allowing easier removal of the pin when operation of the gear reductional assembly so requires.

Looking at FIGS. 1 and 2, mount (20) is attached to support beam (10) in any convenient mode for holding pneumatic motor (22) proximate to gear reduction assembly (12). Pneumatic motor (22) can be of several commercially available types, but specifically, in the present embodiment, pneumatic motor (22) is manufactured by the Gast Manufacturing Corporation and can generate as much as about one hundred and twenty foot pounds of torque. An output line (24) and input line (26) run from pneumatic motor (22) to valve (28) forming what is termed the pneumatic circuit which controls the pressure and the composition of air delivered to pneumatic motor (22). In the present embodiment, valve (28) allows four-way air flow and is provided with a return-to-center lever (30) and first (56) and second (64) air exhaust ports such that when lever (30) is pushed down, telescoping leg (16) lowers foot (18). And when lever (30) is pulled up, telescoping leg (16) raises foot (18). Moreover, in accordance with the present best mode, valve (28) is manufactured by AAA Products International and is capable of withstanding pressures of up to about two hundred and fifty pounds per square inch. Valve (28) and return-to-center lever (30) enhance the safety of operation of the present invention.

In the industry, the tractor generates the air supply for powering both the air brakes of the tractor and those of the trailer. In accordance with the present invention, after the air supplied by the tractor has completed its pathway through the brake line circuit (not shown) of the trailer, a metal, rubber, plastic or any suitable conduit (not shown) from the brake line circuit is connected to air line inlet (34) of air filter/regulator (36). In the present embodiment, air filter/regulator (36) is manufactured by the Wilkerson Corporation and is also provided with a pressure gauge (38) for measuring air pressure entering the previously identified pneumatic circuit. It has been determined that the optimal pressure range in which the pneumatic actuator operates is from about 70 to about 120 pounds per square inch; thereby providing adequate pressure for generating sufficient torque for driving rotable shaft (46). An air line (40) connects filter/regular (36) with lubricator (42). In the present embodiment, lubricator (42) is manufactured by the Wilkerson Corporation and it lubricates the air to be supplied to pneumatic motor (22). It has been found that any commercially available pneumatic-lubricating oil can be used with lubricator (42). Further, it has been determined that to enhance the longevity of pneumatic motor (22), the best composition of air includes about one drop of pneumatic-Lubricating oil for every 50 to 75 cubic feet of air per minute moving through the pneumatic circuit. Lubricator (42) is connected to valve (28) by a second air line (44); thus, the combination of filter/regulator (36) and lubricator (42) control the composition of air reaching pneumatic motor (22), thereby prolonging the workable life of the present invention. Importantly, along with being removable so that the hand crank can be used with shiftable shaft (14), housing (50) also protects the workings it contains from environmental deterioration due to exposure to the natural elements, such as, rain, sleet, snow, ice, salt, dirt, etcetera.

Figure 3:
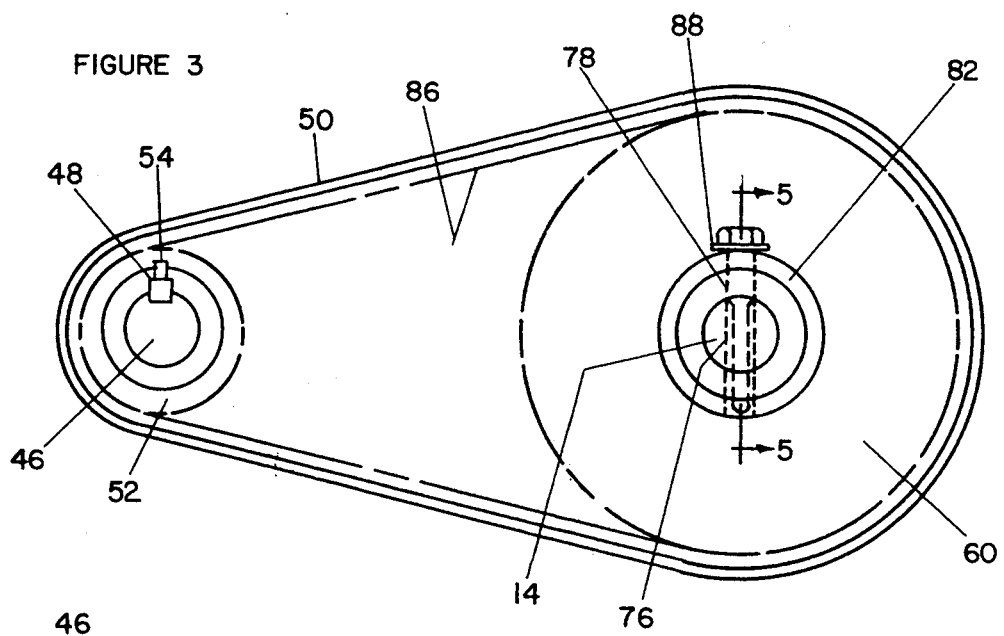
FIG. 3 is a frontal view of the present invention having its housing cover cut away to show the elements therein which are attached to the pneumatic motor and the gear reduction assembly that are mounted to the support beam of the trailer's landing gear (not shown).
Figure 4:
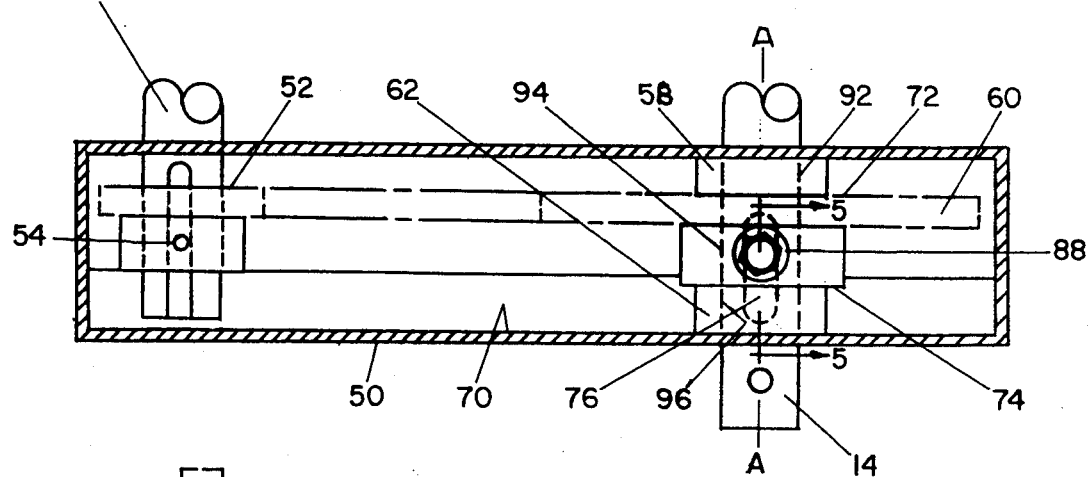
FIG. 4 is a top view of the present invention having its housing cut away to show the elements therein which are attached to the pneumatic motor and the gear reduction assembly that are mounted to the support beam of the trailer's landing gear (not shown).

Attention is now directed to FIGS. 2, 3 and 4 showing rotable shaft (46) extending from pneumatic motor (22) into housing (50). Rotable shaft (46) is coupled with sprocket (52) by using set screw (54) and key (48). Further, sprocket (52) is provided with a conveyor, such as chain (86), for transferring motion from sprocket (52) to sprocket (60) which drives shiftable shaft (14) of gear reduction assembly (12). In the present embodiment, sprocket (52) is shown to be slightly smaller than sprocket (60).

Shiftable shaft (14) extends from gear reduction assembly (12) through housing (50) outboard of support beam (10) including bushing (58), sprocket (60), and bushing (62) while shiftable shaft (14) can be provided with handle (66). On a first side bushing (58) rests against outboard face and seal of housing of gear reduction assembly (12) and on its opposite side bushing (58) rests against inboard face (72) of sprocket (60). On a first side bushing (62) rests against face (70) of housing (50) and on its opposite side outboard face (74) of sprocket (60). In accordance with the practice of the present invention, the combination of housing (50), bushing (58) and bushing (62) journal sprocket (60) allowing for rotable motion of sprocket (60) while preventing sprocket (60) from shifting when shiftable shaft (14) is shifted along the A—A axis shown in FIG. 2. Thus, sprocket (60) is positioned transverse to the A—A axis along which shiftable shaft (14) can float while sprocket (60) is journaled in such a manner as to prevent its movement relative to the A—A axis.

Figure 5:
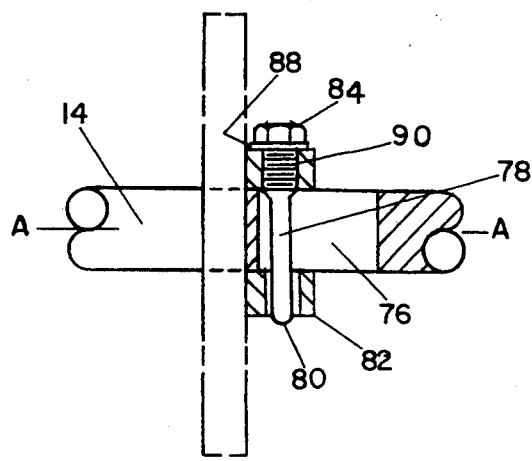
FIG. 5 is a cross-section showing pin, hole and sprocket of shiftable shaft with its pin and hole engagement.

Turning to FIGS. 3, 4 and 5, another unique feature of the present invention is disclosed. Shiftable shaft (14) is of slightly less diameter than inner face (92) of bushing (58), inner face (94) of sprocket (60) and inner face (96) of bushing (62), thereby allowing shiftable shaft (14) to float therethrough and engage selected gearing ratios of gear reduction assembly (12). Floating shiftable shaft (14) is provided with a hole (76) which allows pin (78) to crossect therethrough. In accordance with the present best mode, pin (78) is provided with threads (90) at its second end (84) for engaging meat (82) of sprocket (60) for preventing pin (78) from slipping when it engages shiftable shaft (14). Upon cross-secting shiftable shaft (14), the first end (80) of pin (78) is joined into meat (82) of sprocket (60) and the opposite end (84) of pin (78) is also joined or coupled with meat (82) of sprocket (60). Crossecting hole (76) with the pin (78) transfers rotable motion from sprocket (60) to floating shiftable shaft (14). Additionally, in the present embodiment, pin (78) is also provided with cap (88) to stablize it during its rotation and engagement of floating shiftable shaft (14).

Still in accordance with the present invention, the combination of air lines (40) and (44), filter/regulator (36), lubricator (42), valve (28), input line (26) and output line (24) control the composition and the pressure of air delivered to pneumatic motor (22) which drives shaft (46). Sprocket (52) is turned by shaft (46) while chain (86) conveys motion from sprocket (52) to sprocket (60). And further still, sprocket (60) thereafter transfers rotable motion to pin (78) that transfers rotable motion to floating shiftable shaft (14) which when shifted engages gear reduction assembly (12) at a preselected gearing ratio. Thus, gear reduction assembly (12) rotates turnable shaft (98) and directs the telescopic legs (16) of the landing gear to raise or lower feet (18).

Having disclosed the invention as required by Title 35 of the United States Code, Applicant now prays respectfully that Letters Patent be granted for his invention in accordance with the scope of the claims appended hereto.

What is claimed is:

1. A pneumatic actuator for a gear reduction assembly of a trailer landing gear for directing the raising or lowering of the feet of the trailer, comprising:

a) a mount attached to the trailer for holding a pneumatic motor;

b) an air line of the trailer for supplying pressure to said pneumatic motor rotating a first shaft coupled to a first sprocket;

c) a conveyor for transferring motion from said first sprocket to a second sprocket transverse to a shiftable second shaft having a hole therethrough;

d) a housing attached to said pneumatic motor and said gear reduction assembly for preventing said second sprocket from shifting when said shiftable second shaft is shifted to engage said gear reduction assembly; and e) a pin joined with said second sprocket at each of said pin's ends cross-secting said hole for transferring rotable motion to said second shiftable shaft for turning said gear reduction assembly directing the feet of the trailer.

2. The invention of claim 1 further comprising a first and a second bushing for journaling said second sprocket.

3. The invention of claim 1 wherein said first shaft and said first sprocket are a keyed coupling.

4. The invention of claim 1 further comprising a valve for controlling the air pressure supplied to said pneumatic motor.

5. The invention of claim 4 further comprising a pneumatic circuit including an output and input line from said valve for controlling and supplying air pressure to said pneumatic motor.

6. The invention of claim 1 wherein said conveyor is a chain.

7. A pneumatic actuator for a gear reduction assembly of a trailer landing gear for directing the raising or lowering of the feet of the trailer, comprising:

a) a mount attached to the trailer for holding a pneumatic motor;

b) a filter, a regulator and a lubricator mounted to said trailer for adjusting the composition of air supplying pressure to said pneumatic motor;

c) an air line including a valve controlling the air pressure supplied to said pneumatic motor rotating a first shaft coupled to a first sprocket;

d) a chain for transferring motion from said first sprocket to a second sprocket transverse to a shiftable second shaft having a hole therethrough;

e) a housing attached to said pneumatic motor and said gear reduction assembly for preventing said second sprocket from shifting when said shiftable second shaft is shifted to engage a different ratio of said gear reduction assembly; and f) a pin joined with said second sprocket at each of said pin's ends cross-secting said hole for transferring rotable motion to said second shiftable shaft for turning said gear reduction assembly directing the feet of the trailer.

8. The invention of claim 7 further comprising a first and a second bushing for journaling said second sprocket.

9. The invention of claim 7 further comprising a handle attached to the outboard end of said second shiftable shaft.

10. The invention of claim 7 wherein said first shaft and said first sprocket are a keyed coupling.

11. The invention of claim 7 wherein said valve is a four-way valve.

12. The invention of claim 11 wherein said four-way valve is a levered return-to-center valve.

13. The invention of claim 11 further comprising a pneumatic circuit including an output and input line from said valve for controlling and supplying air pressure to said pneumatic motor.

14. A pneumatic actuator for a gear reduction assembly of a trailer landing gear for directing the raising or lowering of the feet of the trailer, comprising:

a) a mount attached to the trailer for holding a pneumatic motor;

b) a filter, a regulator and a lubricator mounted to said trailer for adjusting the composition of air supplied to said pneumatic motor;

c) a return-to-center four-way valve completing a pneumatic circuit including an input and output line and said pneumatic motor;

d) an air line for carrying air to said pneumatic circuit controlling and supplying pressure to said pneumatic motor rotating a first shaft coupled to a first sprocket;

e) a chain for transferring motion from said first sprocket to a second sprocket transverse to a shiftable second shaft having a hole therethrough;

f) a housing attached to said pneumatic motor and said gear reduction assembly including a first and a second bushing for journaling said second sprocket thereby preventing said second sprocket from shifting when said shiftable second shaft is shifted to engage a different ratio of said gear reduction assembly; and g) a pin joined with said second sprocket at each of said pin's ends cross-secting said hole for transferring rotable motion to said second shiftable shaft for turning said gear reduction assembly directing the feet of the trailer.

15. The invention of claim 14 further comprising a handle attached to the outboard end of said second shiftable shaft.

16. The invention of claim 14 wherein said first shaft and said first sprocket are a keyed coupling.

* * * * *